(12) United States Patent
Levitsky et al.

(10) Patent No.: US 11,470,646 B2
(45) Date of Patent: Oct. 11, 2022

(54) CELLULAR VEHICLE-TO-EVERYTHING (CV2X) ALLOCATION COLLISION REPORTING

(71) Applicant: QUALCOMM Incorporated, San Diego, CA (US)

(72) Inventors: Michael Levitsky, Rehovot (IL); Lior Uziel, Hod Hasharon (IL); Gideon Kutz, Ramat Hasharon (IL); Assaf Touboul, Netanya (IL); Shay Landis, Hod Hasharon (IL); Cheol Hee Park, San Diego, CA (US); Ralph Akram Gholmieh, San Diego, CA (US); Chu-Hsiang Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 17/103,799

(22) Filed: Nov. 24, 2020

(65) Prior Publication Data

US 2022/0167414 A1 May 26, 2022

(51) Int. Cl.
*H04W 72/04* (2009.01)
*H04W 74/08* (2009.01)
*H04W 74/00* (2009.01)
*H04W 72/12* (2009.01)
*H04W 4/40* (2018.01)
*H04W 8/24* (2009.01)
*H04W 72/02* (2009.01)

(52) U.S. Cl.
CPC ......... *H04W 74/0825* (2013.01); *H04W 4/40* (2018.02); *H04W 8/24* (2013.01); *H04W 72/02* (2013.01); *H04W 72/0453* (2013.01); *H04W 72/0493* (2013.01); *H04W 72/1263* (2013.01); *H04W 74/008* (2013.01)

(58) Field of Classification Search
None
See application file for complete search history.

(56) References Cited

U.S. PATENT DOCUMENTS

2020/0274637 A1* 8/2020 Li .................. H04W 72/042
2021/0360605 A1* 11/2021 Hassan ............ H04W 72/0406

* cited by examiner

*Primary Examiner* — Ajit Patel
*Assistant Examiner* — Pamit Kaur
(74) *Attorney, Agent, or Firm* — Seyfarth Shaw LLP

(57) ABSTRACT

A method detecting allocation collisions from transmitting user equipments (UEs) in sidelink channel resources. The colliding allocations are detected and the quantity of allocation collisions is determined. A collision report is transmitted to other sidelink UEs within the coverage zone. The collision report or collision notification provides an indication of sidelink resources having identified colliding allocations. The identified allocation collisions may be pruned to remove potentially intentional collisions before collision report transmission.

28 Claims, 10 Drawing Sheets

CELLULAR VEHICLE-TO-EVERYTHING (CV2X) ALLOCATION COLLISION REPORTING

FIELD OF THE DISCLOSURE

Aspects of the present disclosure generally relate to wireless communications, and more particularly to techniques and apparatuses for cellular vehicle-to-everything (CV2X) communications and allocation collision detection and reporting.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related cellular communications systems (e.g., cellular vehicle-to-everything (CV2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink user equipment (UEs), such as vehicles, may communicate directly with each other using device-to-device (D2D) communications over a D2D wireless link. These communications can be referred to as sidelink communications.

As the demands for sidelink communications increase in general, and CV2X technology specifically penetrates the market and the number of cars supporting CV2X communication grows rapidly, the CV2X network is expected to become increasingly crowded, especially for peak traffic scenarios. As a result, the chance of colliding allocations between UEs may increase. An allocation collision may prevent successful decoding of at least one of the colliding UE transmissions and in some cases may prevent all of the colliding UE transmissions from being decoded. For safety reasons, there is a need to minimize the duration of repetitive collisions between semi-persistently scheduled allocations of colliding user equipments (UEs) or to minimize the number of future collisions in general.

SUMMARY

An aspect of the disclosure provides a method of wireless communication by a sidelink user equipment (UE). The method provides for detecting allocations from transmitting sidelink units in sidelink channel resources. The method then continues with determining a quantity of detected allocations that collide with another detected allocation, in each of the sidelink channel resources. The method provides for transmitting a collision report to other sidelink UEs within a coverage zone, the collision report indicating sidelink channel resources having the colliding allocations.

A further aspect of the disclosure provides an apparatus for wireless communication by a sidelink user equipment (UE). The apparatus includes a memory and a processor. The processor is configured to detect allocations from transmitting sidelink units in sidelink channel resources. The processor is also configured to determine a quantity of detected allocations that collide with another detected allocation, in each of the sidelink channel resources. The processor is further configured to transmit a collision report to other sidelink UEs within a coverage zone, the collision report indicating sidelink channel resources having the colliding allocations.

A still further aspect of the disclosure provides an apparatus for wireless communication by a sidelink user equipment (UE). The apparatus includes means for detecting allocations from transmitting sidelink units in sidelink channel resources. The apparatus also includes means for determining a quantity of detected allocations that collide with another detected allocation, in each of sidelink channel resources. The apparatus further includes means for transmitting a collision report to other sidelink UEs within a coverage zone, the collision report indicating sidelink channel resources having the colliding allocations.

An addition aspect of the disclosure provides a non-transitory computer-readable medium containing instructions, which when executed cause a processor to detect allocations from transmitting sidelink units in sidelink channel resources. Additional instructions cause the processor to determine a quantity of detected allocations that collide with another detected allocation, in each of the sidelink channel resources. Further instructions cause the processor to transmit a collision report to other sidelink UEs within a coverage zone, the collision report indicating sidelink channel resources having the colliding allocations.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
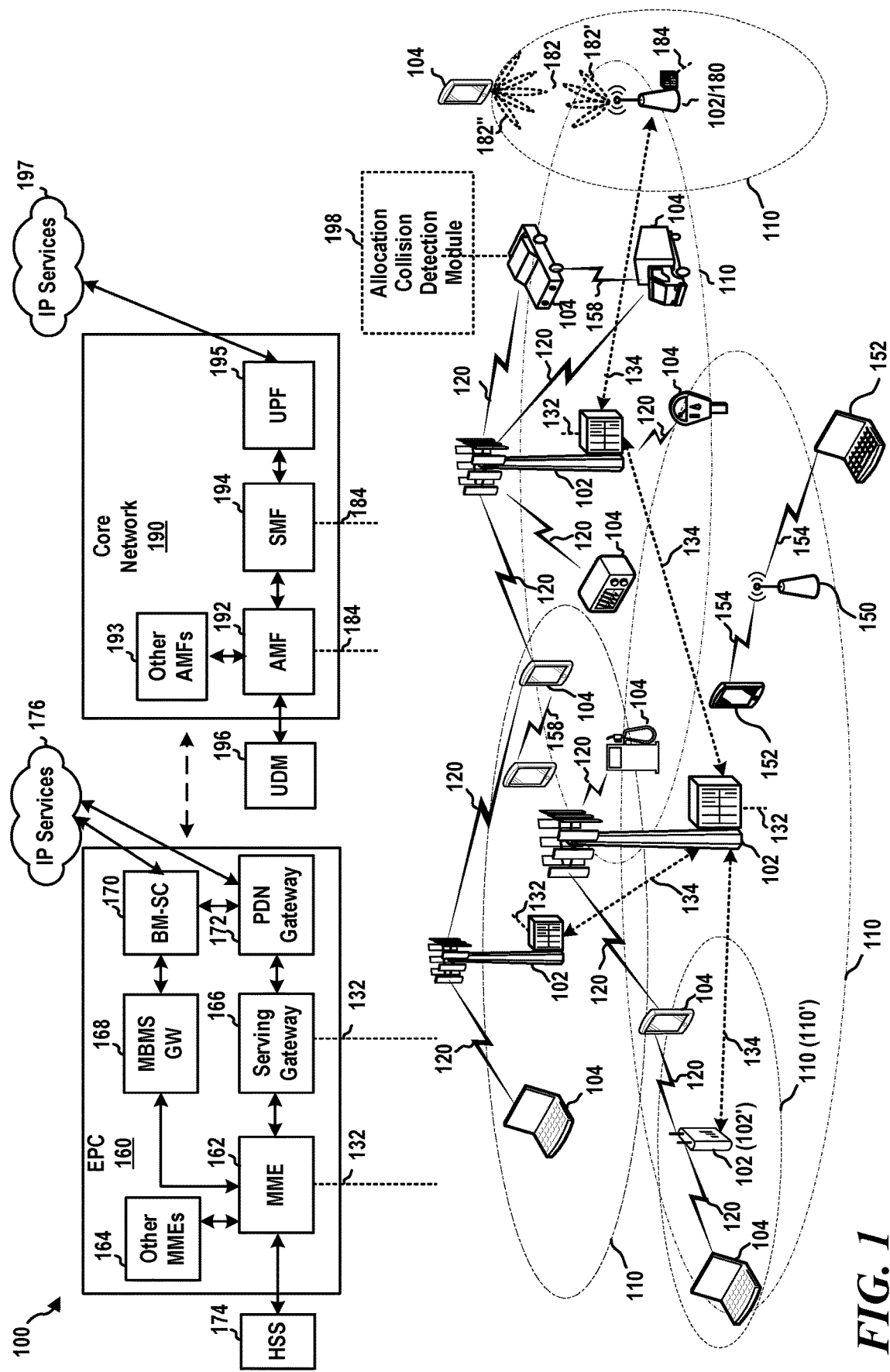
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

Sidelink (SL) communications refers to the communications among user equipment (UE) without tunneling through a base station (BS) and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a BS and a UE. For instance, the PSCCH may carry sidelink control information (SCI) and the PSCCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communications may include, among others, vehicle-to-everything (V2X), industrial IoT (IIoT), and/or NR-lite.

A sidelink user equipment (UE) may detect allocations from other transmitting UEs in sidelink channel resources. The UE may determine a quantity of detected allocations that collide with other detected allocations, in each channel of the sidelink channel resources. The disclosure provides for a UE to transmit a collision report to other sidelink UEs within the coverage zone. The collision report identifies the colliding allocations.

An apparatus for wireless communication by a sidelink user equipment (UE) includes a memory and at least one processor. The processor may form a part of an allocation detection module. The processor may be configured to detect allocations from transmitting UEs in sidelink channel resources.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit and receive point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may include an allocation collision detection module 198 configured to detect allocation collision and full or partial overlaps for UEs, in time or in frequency resources, such as the UE 104, in sidelink transmissions. The allocation collision detection module may also prune potentially intentional collisions from the collision report before transmitting the collision report to other sidelink UEs within the coverage zone.

Although the following description may be focused on 5G NR, it may be applicable to other similar areas, such as LTE, LTE-A, CDMA, GSM, and other wireless technologies.

Figure 2:
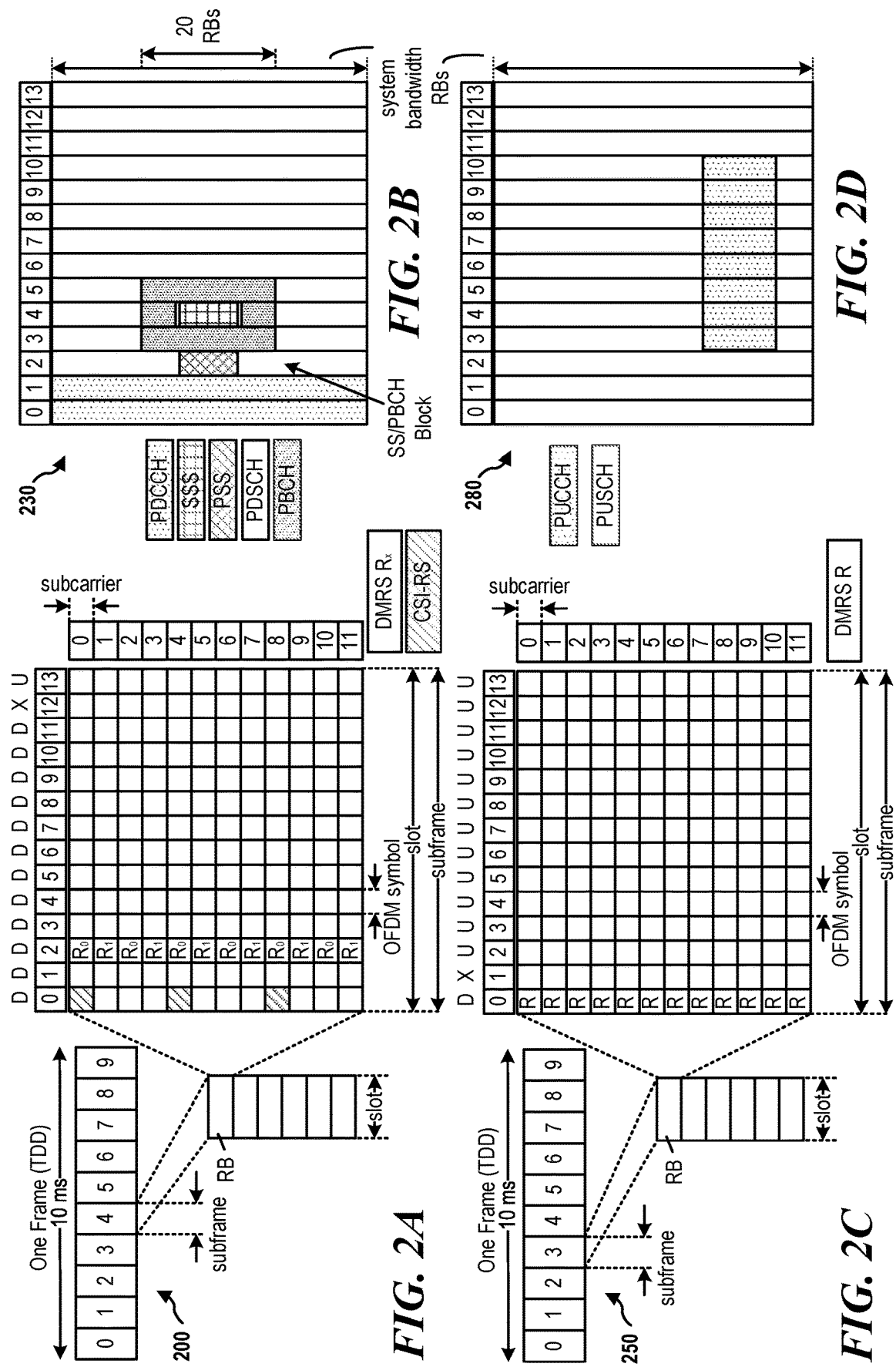
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

Figure 3:
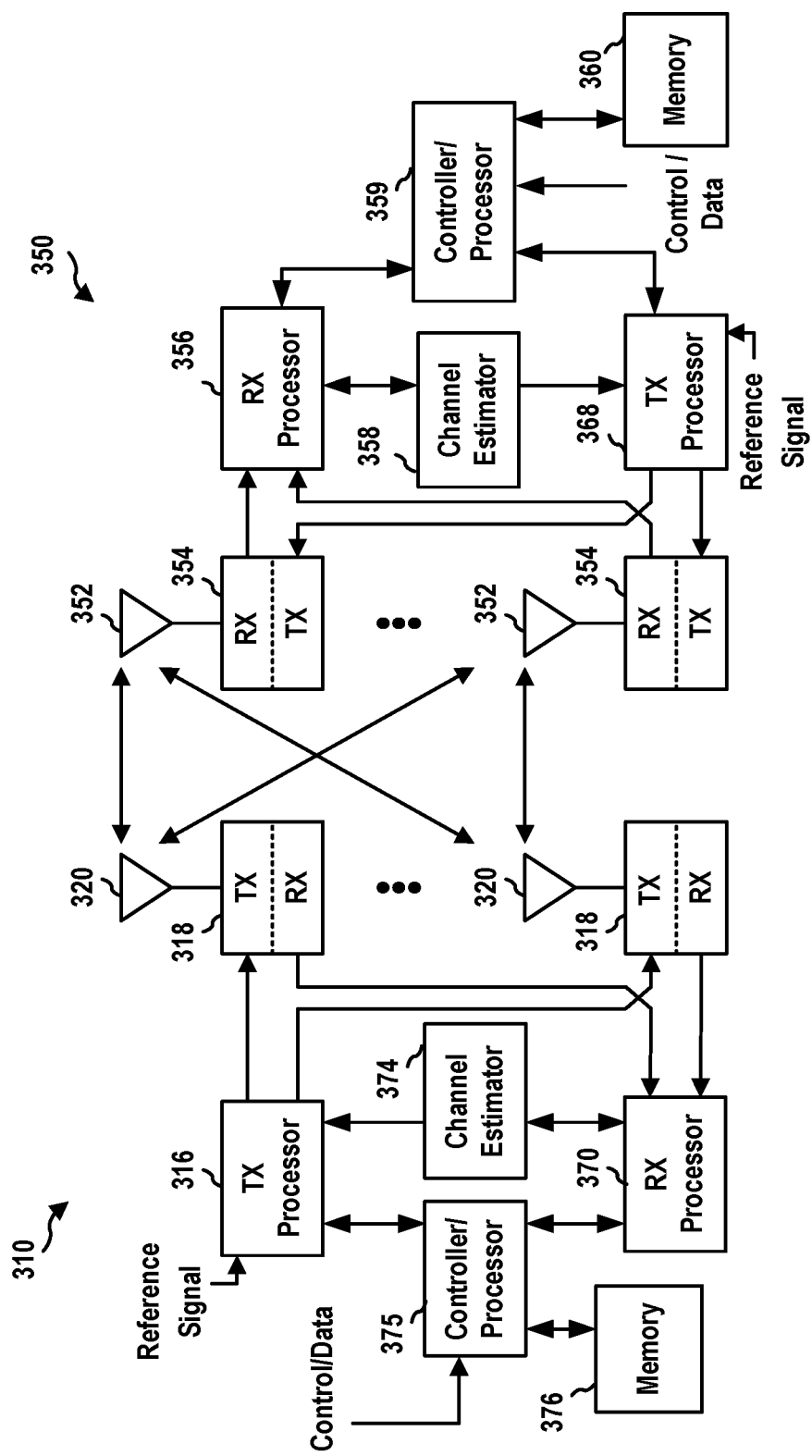
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the allocation collision detection module 198 of FIG. 1. In some aspects, the UE 104, 350 may include means for detecting allocations from transmitting UEs in sidelink channel resources, means for determining a quantity of detected collisions that collide with another detected allocation, in each of the sidelink channel resources; and means for transmitting a collision report to other sidelink UEs within a coverage zone. Such means may include one or more components of the UE 104, 350 described in connection with FIGS. 1 and 3.

Figure 4:
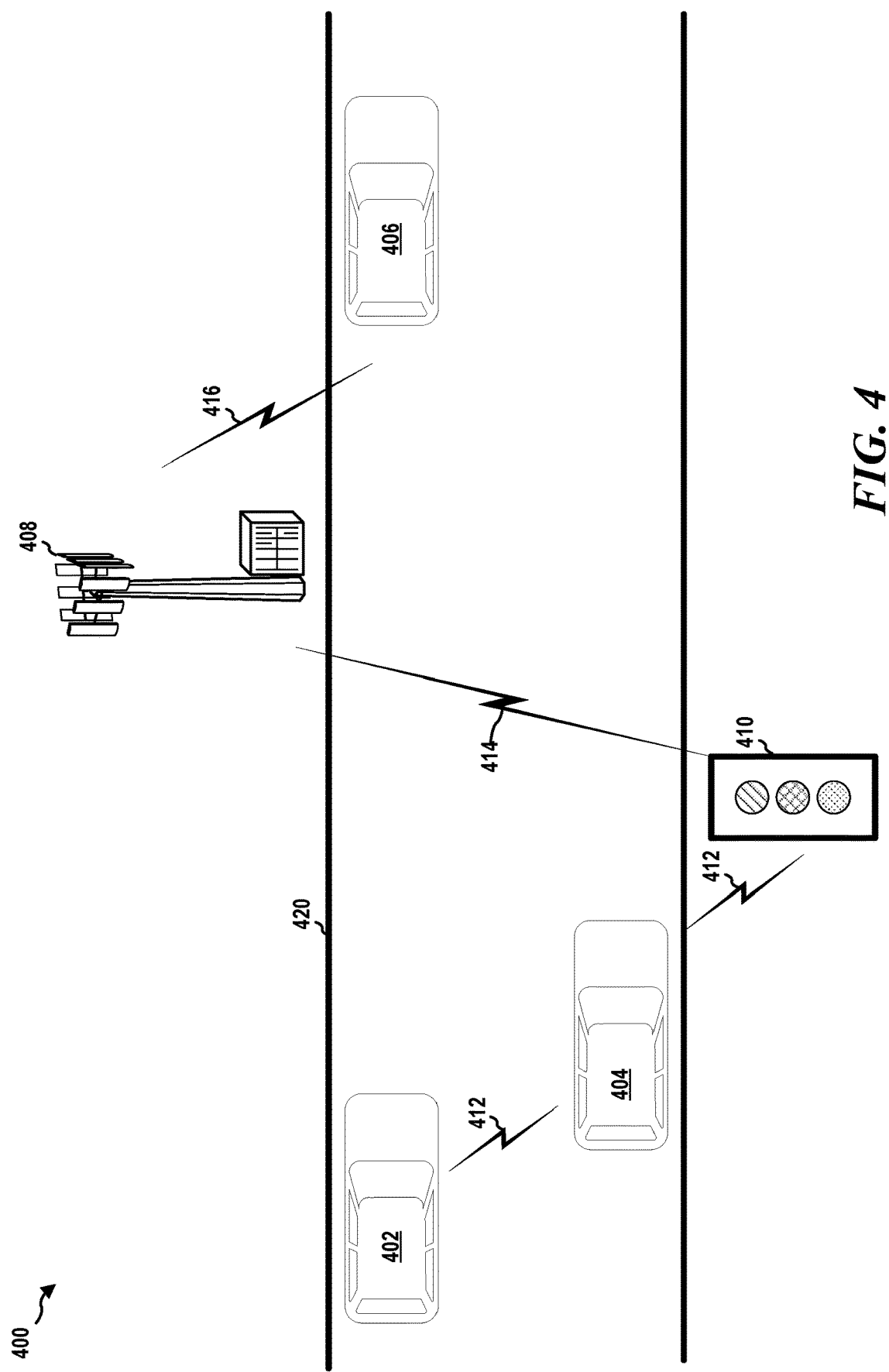
FIG. 4 is a block diagram illustrating an example of a vehicle-to-everything (V2X) system with a road side unit (RSU), according to aspects of the present disclosure

FIG. 4 illustrates an example of a vehicle-to-everything (V2X) system 500 with a road side unit (RSU), according to aspects of the present disclosure. As shown in FIG. 4, a V2X system 400 includes a transmitter UE 404 transmitting data to an RSU 410 and a receiving UE 402 via sidelink transmissions 412. Additionally, or alternatively, the RSU 410 may transmit data to the transmitter UE 404 via a sidelink transmission 412. The RSU 410 may forward data received from the transmitter UE 404 to a cellular network (e.g., gNB) 408 via an UL transmission 414. The gNB 408 may transmit the data received from the RSU 410 to other UEs 406 via a DL transmission 416. The RSU 410 may be incorporated with traffic infrastructure (e.g., traffic light, light pole, etc.) For example, as shown in FIG. 4, the RSU 410 is a traffic signal positioned at a side of a road 420. Additionally or alternatively, RSUs 410 may be stand-alone units.

Figure 5:
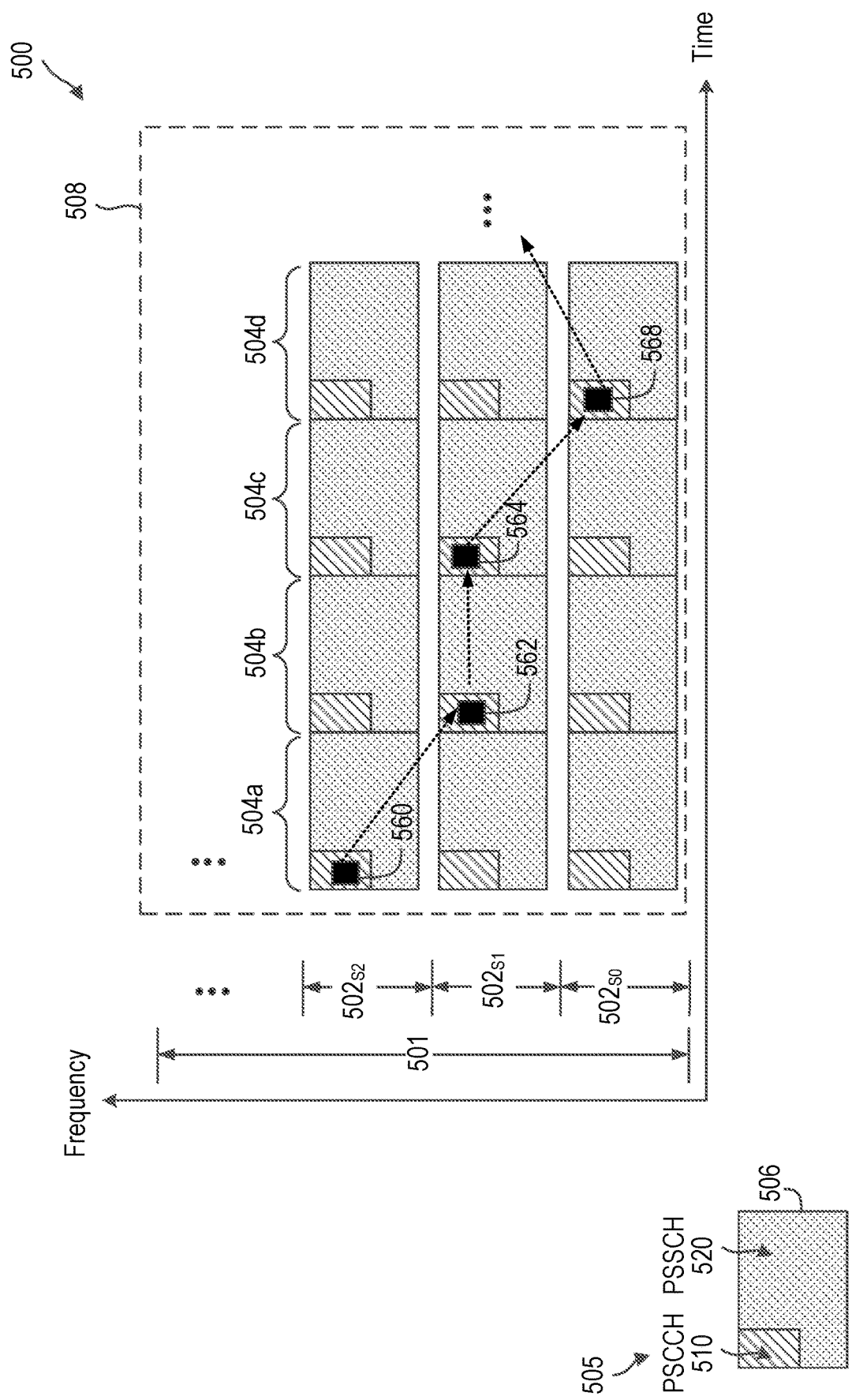
FIG. 5 is a graph illustrating a sidelink (SL) communications scheme, in accordance with various aspects of the present disclosure.

FIG. 5 is a graph illustrating a sidelink (SL) communications scheme in accordance with various aspects of the present disclosure. The scheme 500 may be employed by UEs such as the UEs 104 in a network such as the network 100. In FIG. 5, the x-axis represents time and the y-axis represents frequency. The C2VX channels may be for 3GPP Release 16 and beyond.

In the scheme 500, a shared radio frequency band 501 is partitioned into multiple subchannels or frequency subbands 502 (shown as $502s_0$, $502s_1$, $502s_2$) in frequency and multiple sidelink frames 504 (shown as 504a, 504b, 504c, 504d) in time for sidelink communications. The frequency band 501 may be at any suitable frequencies. The frequency band 501 may have any suitable bandwidth (BW) and may be partitioned into any suitable number of frequency subbands 502. The number of frequency subbands 502 can be dependent on the sidelink communications BW requirement.

Each sidelink frame 504 includes a sidelink resource 506 in each frequency subband 502. A legend 505 indicates the types of sidelink channels within a sidelink resource 506. In some instances, a frequency gap or guard band may be specified between adjacent frequency subbands 502, for example, to mitigate adjacent band interference. The sidelink resource 506 may have a substantially similar structure as an NR sidelink resource. For instance, the sidelink resource 506 may include a number of subcarriers or RBs in frequency and a number of symbols in time. In some instances, the sidelink resource 506 may have a duration between about one millisecond (ms) to about 20 ms. Each sidelink resource 506 may include a PSCCH 510 and a PSSCH 520. The PSCCH 510 and the PSSCH 520 can be multiplexed in time and/or frequency. The PSCCH 510 may be for part one of a control channel (CCH), with the second part arriving as a part of the shared channel allocation. In the example of FIG. 5, for each sidelink resource 506, the PSCCH 510 is located during the beginning symbol(s) of the sidelink resource 506 and occupies a portion of a corresponding frequency subband 502, and the PSSCH 520 occupies the remaining time-frequency resources in the sidelink resource 506. In some instances, a sidelink resource 506 may also include a physical sidelink feedback channel (PSFCH), for example, located during the ending symbol(s) of the sidelink resource 506. In general, a PSCCH 510, a PSSCH 520, and/or a PSFCH may be multiplexed within a sidelink resource 506.

The PSCCH 510 may carry SCI 560 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 506.

In an NR sidelink frame structure, the sidelink frames 504 in a resource pool 508 may be contiguous in time. A sidelink UE (e.g., the UEs 104) may include, in SCI 560, a reservation for a sidelink resource 506 in a later sidelink frame 504. Thus, another sidelink UE (e.g., a UE in the same NR-U sidelink system) may perform SCI sensing in the resource pool 508 to determine whether a sidelink resource 506 is available or occupied. For instance, if the sidelink UE detected SCI indicating a reservation for a sidelink resource 506, the sidelink UE may refrain from transmitting in the reserved sidelink resource 506. If the sidelink UE determines that there is no reservation detected for a sidelink resource 506, the sidelink UE may transmit in the sidelink resource 506. As such, SCI sensing can assist a UE in identifying a target frequency subband 502 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 502 in one sidelink frame 504 to another frequency subband 502 in another sidelink frame 504. In the illustrated example of FIG. 5, during the sidelink frame 504a, the sidelink UE transmits SCI 560 in the sidelink resource 506 located in the frequency subband $502_{S2}$ to reserve a sidelink resource 506 in a next sidelink frame 504b located at the frequency subband $502_{S1}$. Similarly, during the sidelink frame 504b, the sidelink UE transmits SCI 562 in the sidelink resource 506 located in the frequency subband $502_{S1}$ to reserve a sidelink resource 506 in a next sidelink frame 504c located at the frequency subband $502_{S1}$. During the sidelink frame 504c, the sidelink UE transmits SCI 564 in the sidelink resource 506 located in the frequency subband $502_{S1}$ to reserve a sidelink resource 506 in a next sidelink frame 504d located at the frequency subband $502_{S0}$. During the sidelink frame 504d, the sidelink UE transmits SCI 568 in the sidelink resource 506 located in the frequency subband $502_{S0}$. The SCI 568 may reserve a sidelink resource 506 in a later sidelink frame 504.

The SCI can also indicate scheduling information and/or a destination identifier (ID) identifying a target receiving sidelink UE for the next sidelink resource 506. Thus, a sidelink UE may monitor SCI transmitted by other sidelink UEs. Upon detecting SCI in a sidelink resource 506, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 504 in different frequency subband (e.g., via frequency division multiplexing (FDM)). For instance, in the sidelink frame 504b, one pair of sidelink UEs may communicate sidelink data using a sidelink resource 506 in the frequency subband $502_{S2}$ while another pair of sidelink UEs may communicate sidelink data using a sidelink resource 506 in the frequency subband $502_{S1}$.

In some aspects, the scheme 500 is used for synchronous sidelink communications. That is, the sidelink UEs may be synchronized in time and are aligned in terms of symbol boundary, sidelink resource boundary (e.g., the starting time of sidelink frames 504). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 508 in the frequency band 501, for example, while in coverage of a serving BS. The resource pool 508 may include sidelink resources 506. The BS can configure the sidelink UE with a resource pool configuration indicating resources in the frequency band 501 and/or the subbands 502 and/or timing information associated with the sidelink frames 504. In some aspects, the scheme 500 includes mode-2 RRA (e.g., supporting autonomous radio resource allocation (RRA) that can be used for out-of-coverage sidelink UEs or partial-coverage sidelink UEs).

Cellular vehicle-to-everything (C2VX) protocols enable vehicles to communicate and exchange messages or information with other vehicles, devices, and infrastructure. Vehicles or devices may exchange information such as their location, speed, and direction with each other. In addition, emergency and warning messages such as braking alarms, red light warning, emergency braking, tunnel entry warning, and road work cautions, and similar messages may be transmitted. This information is shared on a certain minimum periodic basis and may be used to generate critical alerts to other vehicles, drivers, or devices. When necessary, infrastructure nodes help relay messages to vehicles at longer distances. Vehicles or devices, such as UEs, select their own resources for transmitting autonomously, that is, without direction from a network. The vehicle-to-vehicle communications incorporating autonomous resource selection use the PC5 interface, which is based on direct long-term evolution (LTE) sidelinks. In addition, UEs select transmission resources to satisfy latency, periodicity, and message size requirements.

Communication resources for both transmitting and receiving are allocated in subframes or slots. Transmission scheduling is autonomous and may be semi-persistent scheduling (SPS) or event driven scheduling. Event driven scheduling may be for alarm messages or one time transmissions. In addition, event driven scheduling may also be used for any transmission with a lower latency requirement than SPS scheduling allows and may also be used for message sizes that do not fit SPS resources. The transmission scheduling may be based on CV2X resource sensing procedures performed on received subframes. Sensing procedures use received signal strength indication (RSSI) measurements for candidate Tx resource detection and may use received signal received power (RSRP) measurements for candidate Tx resource exclusion. Resources may be selected on a two-dimensional frequency versus time map with subchannel grids in the frequency dimension and subframes in the time dimension. Autonomous resource selection refers to the selection of a subframe from the available subframes. Although the description of resources is primarily with respect to subframes, other resources, such as slots, are also contemplated.

For determining a candidate transmit resources list, a V2X device, such as a UE, may identify a subset of twenty percent of the resources having the lowest resources energy (RSSI measurement). Each UE selects transmission resources randomly from the candidate transmit resources list identified by each UE. The selected transmission resources may be used for any type of transmissions, such as semi-persistent scheduling (SPS) for a time duration that may last up to several seconds. There is a non-zero probability that two UEs will randomly select the same transmission resources from the identified transmission resources list for SPS transmission scheduling, which results in an allocation collision on the selected transmission resources.

For SPS scheduling, monitoring of resource occupation and the time duration of occupation may be indicative of resource usage for a longer time period. However, hidden UEs may affect the actual resource usage, which may differ from what is revealed by monitoring or sensing procedures. With some SPS sessions lasting up to several seconds, hidden UEs may not be visible for periods of time, preventing other UEs from sensing the hidden UEs. This may lead to transmission scheduling on resources occupied by hidden UEs, which will result in allocation collisions.

Colliding UEs may not be able to identify the collision and will continue to collide for the duration of the SPS time period, which may be several seconds, before the colliding UEs reschedule their colliding transmissions to other resources. To address long lasting allocation collisions, the selection of transmission resources may use an allocation collision detection module 198, described above in connection with FIG. 1. The allocation collision detection module 198 helps to ensure that UEs transmit and receive on vacant resources whenever possible and prevents or minimizes collisions and/or duration of the collisions.

Before a UE transmits, the UE selects resources for the transmission. Ideally, the selected resources are vacant or at least include few or weak transmissions having lower priority messages. Autonomous resource selection for transmitting on vacant resources includes power estimation (e.g., based on received signal strength indication (RSSI) measurements) to determine whether a resource is occupied. When determining candidate resources for transmission, a transmitting UE excludes unmeasured subframes due to previous transmissions, and also excludes resources based on expected conflicts with other UEs.

Colliding UEs may not identify allocation collisions, as CV2X may be a half-duplex system. In a half-duplex communication system, a transmitting device does not receive on the same subframe. Thus, a transmitting device cannot measure the resources used for transmissions by other UEs on the same transmission subframe. For every subframe, in a half-duplex communication system, the CV2X device may be in transmit mode or receive mode. Once a UE is in transmit mode, the UE cannot receive on the transmit subframe. When this occurs, no sensing measurements are made on the subframe. Thus, colliding UEs in transmit mode on the subframe are unable to detect the colliding allocations from each other. Aspects of the present disclosure may assist in collision detection and reporting. In some aspects, the CV2X UEs within a CV2X coverage zone may jointly provide real time warnings of collisions by transmitting indications of the monitored and detected collisions in a collision report or collision notification. The transmission of the collision reports may utilize broadcasting, multicasting, or unicasting techniques. The UEs within the CV2X coverage zone also monitor for the transmitted collision reports and identify if a UE has any actively scheduled transmission on the colliding resources indicated in the report. A UE currently using resources indicated as colliding in the received report, will reschedule its transmissions to stop or reduce colliding for future transmissions.

Aspects of the present disclosure provide for reporting of collisions observed in a neighborhood (also referred to as coverage zone) by a UE over the corresponding monitored resources to help a transmitting UE on the same resources to become aware of allocation collisions that may be relevant. On the subframes where a CV2X UE is in a reception mode, the UE monitors all of the control channels of the CV2X channel/band and detects control channel (e.g., physical sidelink control channels (PSCCHs)) transmissions and shared channel allocations related to them (e.g., physical sidelink shared channels (PSSCHs)) transmitted from UEs in its neighborhood, (e.g., CV2X coverage area). The UEs in the neighborhood may also include infrastructure units, such as RSUs. The control channels and the associated shared channels may be transmitted within each CV2X resource defined by a subframe index in the time dimension and the CV2X subchannel index in the frequency dimension. The PSSCH may occupy several subchannels. The UE determines presence of control channels in each control resource by attempting to demodulate and decode control channel hypotheses based on a demodulation reference signal (DMRS) time cyclic shift or DMRS sequence hypothesis testing.

The strongest cyclic shift and DMRS sequence hypothesis per specific control channel resource may be addressed for control channel decoding on the basis that there is a single control channel allocated on a specific control channel resource. However, when a control channel allocation collision occurs, different colliding allocations may be associated with a different control channel hypothesis, because the DMRS cyclic shift (CS) and DMRS sequence option (in some cases, e.g., Release 16 systems) are randomly selected by the transmitting UEs on each transmission occasion.

Each control channel hypothesis may be detected by successful decoding. Successful decoding of more than a single control channel (CCH) hypothesis on the same CCH resource may serve as a basis for collision detection on the addressed resource, or subchannel. The existence of multiple control channel allocations on the same CCH resource, which is an allocation collision, may also be detected without successfully decoding all the colliding CCH allocations, based on different CCH hypotheses. This may be performed in the domain of an estimated channel impulse response (CIR) based on the corresponding CIR and its aggregated energy metric obtained in each one of the cyclic shift ranges in the CIR response for every tested DMRS sequence option. The energy threshold is a metric for CIR energy estimated on a corresponding cyclic shift zone from the full CIR response. An allocation collision may be determined where the CCH hypothesis energy metric crosses a threshold for several CCH hypotheses on the same CCH resource.

According to aspects of the present disclosure, the UE may detect a number (or quantity) of detected control channel allocations on the same control channel resource. The number may be based on whether a number of control channel hypotheses on the same resource are successfully decoded, or whether a number of control channel hypotheses have an associated CIR energy metric that is above a threshold value. For example, if the UE detects two control channel hypotheses with the estimated CIR energy values above the threshold value within a particular control channel resource associated with a specific CV2X subchannel on a specific subframe, the UE determines two control signals are present on the control resource and on the specific subchannel and specific subframe. A CV2X channel may be a dispersive channel with multiple paths (e.g., CIR taps). The CIR taps may be aggregated to produce an energetic metric per hypothesis.

Collisions and overlaps may be caused by hidden UEs. A UE may be hidden due to coverage. Thus, the hidden UE is not seen by some the CV2X UEs that are in a reception mode, that is, monitoring CV2X resources, while the hidden UE may be in a transmission mode. Referring to FIG. 4, the RSU 410 may transmit data to the UE 404 via a sidelink transmission 412. The UE 402 may not be sensed by the RSU 410 because the UE 402 may be too far from the RSU 410 or the corresponding channel between the two UEs experiences severe shadowing. Hidden UEs will not exclude each other when selecting resources and may therefore send colliding transmissions if the UE selects the same transmission resource.

In addition, UEs may be hidden due to the half-duplex design of many UEs. A half-duplex UE cannot transmit and receive at the same time. When transmitting, signals from the transmitting UE may collide with signals from other transmitting UEs in the same coverage area because none of the colliding UEs can receive, sense, or detect signals from the other UEs while transmitting. In effect, while transmitting, a UE is deaf to other UEs. Such collisions and overlaps are detrimental to cellular vehicle-to-everything (CV2X) communication.

Aspects of the present disclosure provide methods for reporting collisions and overlaps by a CV2X UE (also referred to as a reporting UE). A UE may be any of the UEs 104, 402, 404, and 406 of FIGS. 1 and 4. According to aspects of the present disclosure, a UE that detects collisions and overlaps may report the collisions and overlaps to a specific transmitting UE involved in the detected collision (e.g., unicast transmission) or to a group of transmitting UEs (e.g., multicast transmission), or to all of the UEs in a CV2X coverage area (e.g., broadcast transmission). The transmitting UE may select transmission different resources based on the reporting, improving the chances of avoiding future collisions or overlaps.

Figure 6:
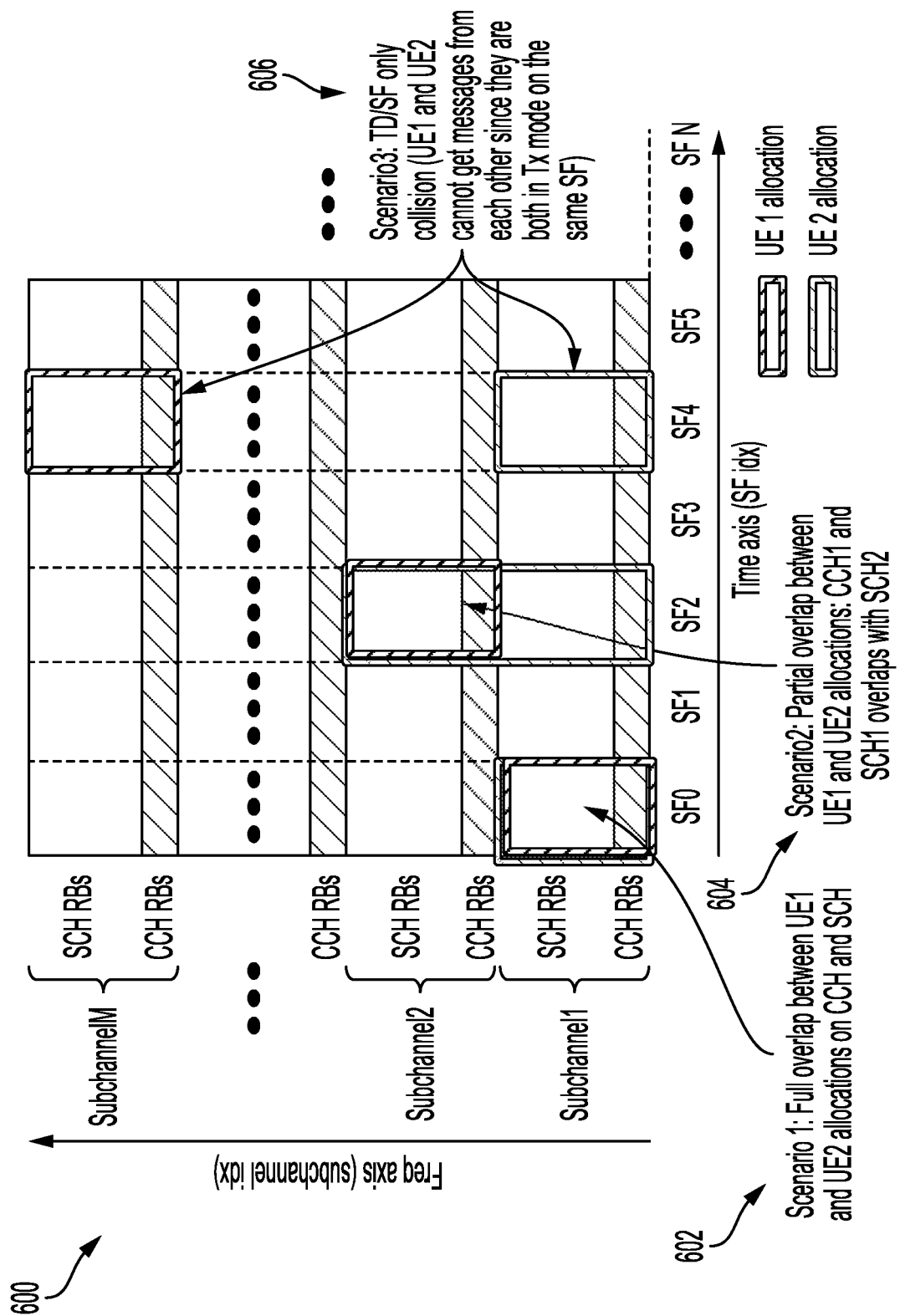
FIG. 6 is a diagram illustrating collision scenarios, in accordance with aspects of the disclosure.

FIG. 6 is a diagram illustrating collision scenarios, in accordance with aspects of the disclosure. FIG. 6 shows a cellular vehicle-to-everything (CV2X) resource map 600 in accordance with 3GPP Release 14 and Release 15. The CV2X resource map 600 plots time on the horizontal axis and frequency on the vertical axis. The time axis is divided into numbered subframes from SF 0 through SF N. The frequency axis is divided into subchannels, from subchannel 1 through subchannel M. Each subchannel has control channel (CCH) resource blocks (RBs) and shared channel (SCH) (e.g., data) RBs.

FIG. 6 depicts three collision scenarios. A first collision scenario 602 has full overlap between the allocations of UE 1 and UE 2 on both the control channel and the shared channel in SF 0. A second collision scenario 604 has a partial overlap between the UE 1 and the UE 2 allocations with the CCH 1 and the SCH 1 of UE 1 overlapping with the SCH 2 of UE 2 in SF 2. A third collision scenario 606 is a time domain collision, but not a frequency domain collision. A time domain only collision occurs when two UEs have transmissions on the same subframe but on different frequency resources (subchannels). The UEs in this third collision scenario 606 cannot receive transmitted messages from each other on this subframe because of the half-duplex transmission. If two geographically close UEs are involved in the third type of collision scenario, the UEs may be unable to prevent an accident between them because neither UE may receive at least some of the CV2X messages from one another in time.

Figure 7:
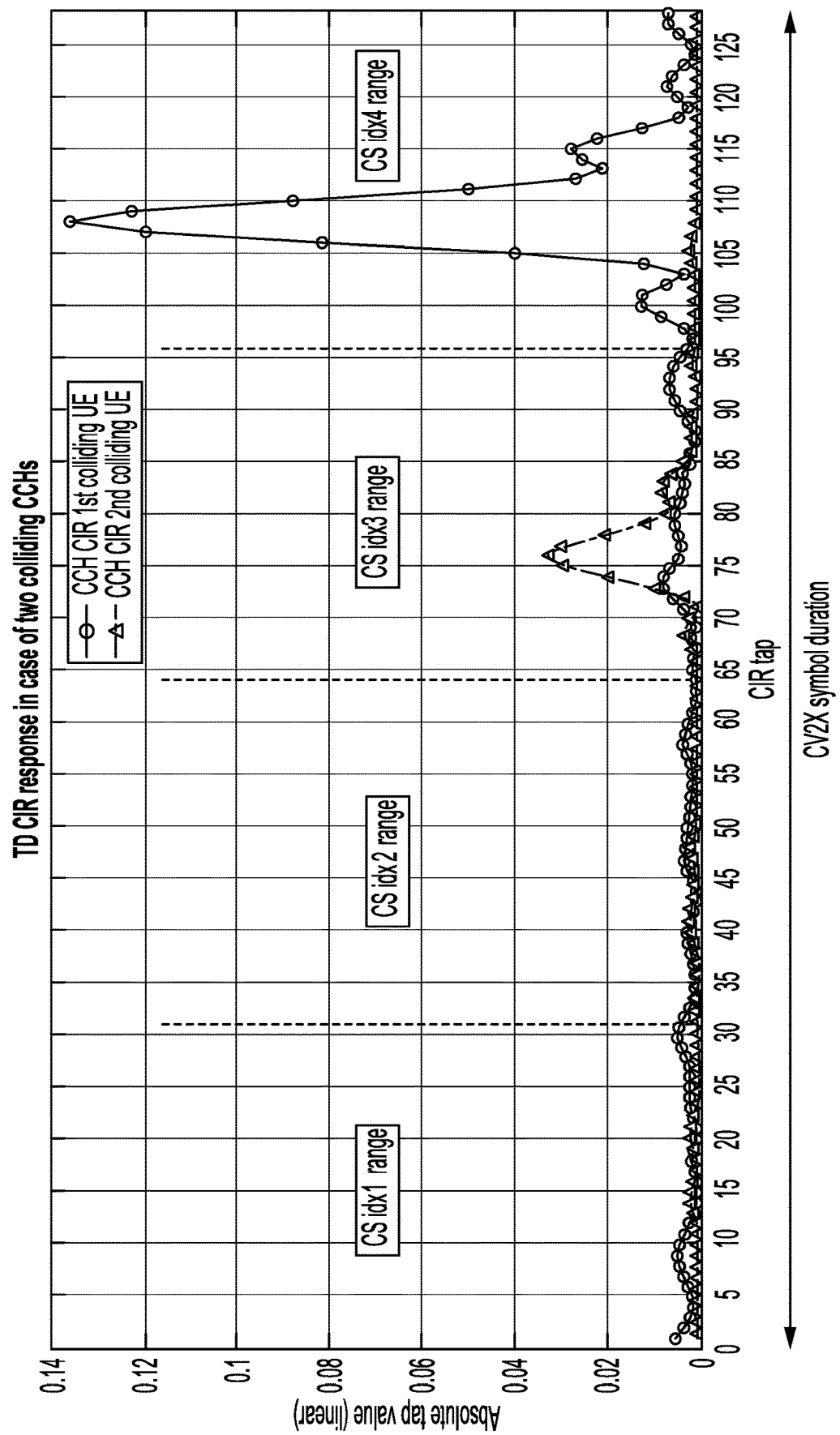
FIG. 7 is a graph illustrating a fully overlapping collision in a time period, in accordance with aspects of the disclosure.

FIG. 7 is a diagram illustrating a fully overlapping collision in a subchannel and in a time period, (SF) in accordance with aspects of the disclosure. That is, a control channel from UE1 collides with a control channel from UE2 in the same subchannel and the same SF or symbols. Control channel (CCH) collisions may be detected using multiple hypothesis decoding of the control channels. For 3GPP Releases 14 and 15, control channel transmission may be performed using a constant demodulation reference signal (DMRS) sequence and with a randomly selected cyclic shift (CS), by each UE, in time for each transmission. This cyclic shift may be randomly selected from several pre-defined cyclic shift options. This CS selection allows differentiation between colliding CCHs in the time domain (TD) based on an observed channel impulse response (CIR).

The cyclic shift may be randomly selected among four values that separate the symbol time range into four non-overlapping subzones. The subzones are shown in FIG. 7 with the cyclic shift (CS) identifiers CS idx 1 (index 1) range, CS idx 2 (index 2) range, CS idx 3 (index 3) range, and CS idx 4 (index 4) range. The four non-overlapping subzones CS idx 1 range, CS idx 2 range, CS idx 3 range, and CS idx 4 range make the control channels with different cyclic shift nearly orthogonal in terms of the time domain, as shown in FIG. 7. Thus, the signal received in the CS idx 3 range is detectable, as is the signal received in the CS idx 4 range, even though they both are in the same symbol. In other words, although the two transmissions arrive in the same symbol, because of the cyclic shift offset, the signals can be distinguished from one another. Thus, a UE may detect the collision between the control channel allocation arriving in the CS idx 3 range with a maximum CIR tap peak at approximately the CIR taps 76-77 and the control channel arriving in the CS idx 4 range with a maximum CIR tap peak at approximately the CIR tap 108. Each CS hypothesis may be represented by the CIR energy metric determined from the corresponding CS CIR response subzone.

In some cases, however, two transmissions may have the same cyclic shift. In these cases, the two control channel transmissions are not orthogonal. As a result, only the strongest signal will be decoded. Thus, some of the colliding control channel allocation may not be decodable if those colliding control channels are transmitted with a DMRS having the same CS configuration. If this occurs, it may not be possible to identify the collision from a single scheduling occurrence, in contrast to when transmissions use different cyclic shifts, enabling identification of the colliding control channels in a single scheduling occurrence.

Aspects of the present disclosure are directed to identifying collisions between control channels, even when colliding control channel transmissions have the same cyclic shift on some of the transmission occurrences, by observing multiple control channel transmission occurrences of the same SPS scheduling. If two control channels collide then the shared channels automatically collide. An overlap between the shared channels may vary because the two colliding control channels may signal (e.g., the associated PSSCH) a different shared channel allocations size. Every subsequent transmission of the same SPS scheduling may use a different cyclic shift randomly selected by a transmitting UE for each transmission. Thus, the combination of cyclic shifts for colliding control channels varies for each transmission. Because the collisions targeted for identification use SPS, every subsequent scheduling occurrence may provide a new opportunity to detect the collision. After four subsequent transmissions of the same SPS, the probability of detecting a collision is nearly one, as shown in Table 1, below. Increasing the number of trials to detect a collision between two SPS streams increases the probability of detection according to the formula below (applicable to Release 14 and Release 15 CV2X UEs):

$$P_{det}(n) = 1 - (4/16)^n,$$

where n is a number of observation subframes with the same colliding control channel allocations.

The detection time and detection probabilities are shown in Table 1, below for up to four transmission occurrences of the same SPS (also referred to as observation subframes).

TABLE 1

| n | $P_{det}(n)$ | Detection Time |
|---|---|---|
| 1 | 0.75 | SPS_period |
| 2 | 0.9375 | SPS_period * 2 |
| 3 | 0.9844 | SPS_period * 3 |
| 4 | 0.9961 | SPS_period * 4 |

For 3GPP Release 16 and beyond, different orthogonal control channel hypotheses for a control channel may use a combination of different cyclic shifts, as described above and different demodulation reference signal (DMRS) sequences. To detect control channel collisions for Release 16 and beyond, control channel hypotheses based on both cyclic shift and DMRS sequences should be decoded.

According to aspects of the present disclosure, a UE may also detect collisions between a shared channel and a control channel, as seen in the second collision scenario 604 of FIG.

6. A shared channel transmission may be performed with a demodulation reference signal (DMRS) different from the control channel DMRS, and thus collision detection between the control channel and the shared channel is different. The shared channel to control channel collision may be identified by decoding sidelink control information fields from both conflicting transmissions. Based on the sidelink control information, the UE may determine where a shared channel is expected. For example, the UE may build a mapping of the corresponding shared channel locations known from the resource indication value (RIV) fields of the corresponding decoded sidelink control information.

In this situation described above, both control channels are assumed to be decodable. A control channel may be decodable even with a negative signal-to-noise ratio (SNR) that is above a sensitivity threshold. If the CCH SNR is below the sensitivity threshold because of an overlap with a strong CCH, then the CIR taps may also be below the value of the interference added to the noise floor. As a result, the taps may not be detectable based on the energy metric. Each allocation in Release 14 and Release 15 may be transmitted using transmissions and retransmissions. Each transmission and retransmission has a corresponding CCH having a resource indication value (RIV) field. The RIV field provides information on the SCH mapping of transmissions and retransmissions. The RIV may be redundant because decoding one of the two CCHs related to the same allocation may also yield the mapping information. Any two of the CCHs may be addressed in general for collision detection, with one CCH providing information for the current SCH and the other providing information for the retransmissions SCH up to fifteen subframes later. The second CCH provides information on the transmissions and retransmissions up to fifteen subframes earlier. The transmission and retransmission may have a gap of up to fifteen subframes.

According to aspects of the present disclosure, after the collisions have been detected and mapped, the collision map may be pruned before transmitting a collision report. For example, some collisions may be intentional and introduced by transmission scheduling algorithms for higher priority messages in highly congested scenarios, and thus, should be allowed to exist. A higher priority message may be an emergency message, for example. Some CV2X resources having relatively low power may be classified as available for scheduling higher priority messages, depending on the CV2X channel busy ratio (CBR). Due to the low energy on these resources, the high priority messages may still be decodable even though a collision occurs, such as when there is intentional overwriting by the transmission scheduling algorithm. That is, the interfering energy on the lower power resources may not prevent decoding of scheduled higher priority transmissions by the nearest UE. Such intentional collisions may be excluded from the collision report.

According to aspects of the present disclosure, identified collisions are analyzed subject to a congestion scenario and may be pruned if the collisions align with a congestion scheduling policy. The congestion scheduling policy may be based on a channel busy ratio (CBR), which is defined as the portion of a subchannel (measured by a sensing procedure) over a sensing period duration with an RSSI measured above a pre-defined threshold.

According to aspects of the present disclosure, pruning intentional collisions from the collision report may begin with attempting to decode the sidelink control information for each of the transmissions involved in an allocation collision. Then, the UE may measure the control channel/shared channel (CCH/SCH) received signal received power (RSRP) for the decoded channels. The colliding allocations are then sorted in increasing order based on the RSRPs. The UE measures RSRP differences and priority differences, with priority information conveyed by the control message, of the colliding allocations in accordance with formulas (1) and (2) below:

$$\Delta_{RSRP} = RSRP_2 - RSRP_1 \quad (1)$$

$$\Delta_{Priority} = \text{Priority } (SCI_2) - \text{Priority } (SCI_1) \quad (2)$$

where $\Delta_{RSRP}$ represents the RSRP difference, $RSRP_1$ and $RSRP_2$ are RSRPs for the first and second transmissions, $\Delta_{Priority}$ is the priority difference, and Priority ($SCI_2$) and Priority ($SCI_1$) are message priorities for the first and second transmissions.

Once the measuring is completed, the pruning criteria, given in formula (3) below, is applied so that collisions with an RSRP difference less than a threshold (THR) are not pruned.

$$\Delta_{RSRP} < THR(\Delta_{Priority}, CBR) \quad (3)$$

where $THR(\Delta_{Priority}, CBR)$ is a threshold that is a function of the priority difference and how busy the channel is (channel busy ratio (CBR)).

According to aspects of the present disclosure, sidelink information from the application level that provides the associated UE locations may also be used for more efficient allocation collision pruning. This sidelink information may be useful in cases where the instantaneous RSRP measurement may be misleading. This approach may also aid in pruning time domain only collisions.

After pruning, the UE may build the collision report. The collision report may include a list of resources where collisions were detected. The collision report may be in the form of a two-dimensional bit map where each bit corresponds to the CV2X resources from the two-dimensional resource map, (e.g., subchannel, subframe). Each bit may be set to one in case of the event of a collision on the corresponding resource. In some aspects, each resource may be described by its frequency subchannel as well as its subframe index. In other aspects, the report may also include a description of the subset of resources over which collision measurements were performed by the reporting UE.

Once the collision report has been built, it is transmitted to the UEs in the coverage zone. The collision report may be broadcast to the UEs, but may also be multicast or unicast, for example, with Release 16 and later UEs. When the collision report is transmitted using multicast and unicast, the collision report may be transmitted to a specific group of UEs, or to a particular UE. A further aspect may provide a collision notification for a specific UE with a description of the resources where the specific UE has a transmission involved in the identified collisions. Selecting the group of UEs or particular UE may be based on the UEs involved in the detected collision. Transmitting the collision report using multicast or unicast may rely on a field in the control channel that identifies each UE and allows association of each colliding allocation to specific UEs based on the control channel decoding.

According to aspects of the present disclosure, the collision report may be sent as a data message on the application layer or may be sent on the physical (PHY) layer depending on a deployment scenario. The PHY layer may have a defined reporting procedure as part of the PHY layer procedures definitions. For example, when a combination of Release 14, 15, 16 or later UEs are deployed, the UEs may report collisions based on Release 16 or higher PHY layer definitions and may use the corresponding reporting framework in accordance with a collision reporting definition specified by 3GPP. When only Release 14 and 15 UEs are deployed, the UEs may transmit the collision report as a data message of the application layer. For example, the UEs may send the collision report as data packets in the CV2X safety application level. The data message format may be either proprietary or standardized. In a deployment scenario including Release 14, 15, 16 and later UEs, as well as wide area network (WAN) LTE or new radio (NR) UEs, the UEs may transmit the report via WAN on either the application layer or the PHY layer. For PHY layer reporting option, specification definitions for the WAN PHY layer may introduce a new report type dedicated for CV2X collision reporting.

Once the collision report has been transmitted to the UEs, each UE monitors the collision report and determines if any of the resources used for the UE's active scheduled transmissions are included in the collision report. If the UE's scheduled transmission resources are included in the collision report, the UE triggers rescheduling procedures to stop colliding on the SPS transmission resources or to avoid collisions for a reserved retransmission resource, or for any type of scheduled future transmission. A reserved retransmission resource is a conditionally scheduled resource for 3GPP Release 16 and beyond systems. As an example, for a CV2X configuration where a UE has a single SPS transmission session within 100 msec, collisions may be stopped in 400 milliseconds or less once rescheduling occurs. In many cases, the collisions may be stopped within 100 milliseconds if the collisions are detected after a single transmission occurrence of the colliding allocations.

Based on the collision reports received, a transmitting UE may select or reselect a transmit resource subchannel and subframe, according to the collision information. Reselection may include dropping an existing semi-persistent schedule (SPS) and beginning a new SPS.

Multiple UEs reporting collisions based on the monitoring of the same resources results in multiple duplicative collision reports. The duplicative collision reports may have identical content and needlessly waste channel capacity.

To support collision reporting for the CV2X band, a UE may have significantly increased processing requirements because of the need to decode multiple control channel hypotheses on every CV2X subchannel and on every received subframe. A CV2X UE may address the strongest CCH hypothesis detected on each subchannel and subframe. Aspects of the disclosure provide distributed processing mechanisms to ease the additional processing for a specific UE in support of allocation collision reporting.

In one aspect, collision reporting may be defined as a capability, or as a best effort if following a proprietary framework. To reduce an expected increase in processing requirements, the pool of CV2X resources may be subdivided into subsets in relation to allocation collision reporting. Some subsets may include a fraction of subframes in time and/or some subsets may include a fraction of subchannels in frequency. Based on the UE capability (or best efforts indication), a limited number of subsets may be opportunistically addressed by a UE for monitoring for collision reporting over the reduced number of resource subsets. Each collision report may provide a description of the resource subset(s) that were measured.

In another aspect of the present disclosure, each UE monitors received collision reports and identifies resource subsets not covered by the reporting. In this aspect, each UE may select collision measurement resources from the non-covered resource subsets.

According to these aspects of the present disclosure, collision reporting coverage may be provided with a jointly distributed effort by the UEs within a coverage zone. This distributed effort ensures that additional processing requirements are reasonable and limited. Moreover, in some aspects, only a limited number of more capable UEs monitor for and report collisions. These more capable UEs may be infrastructure units, for example. An additional advantage of the distributed effort is that "flooding" of the CV2X channels by transmissions of numerous collision reports covering the same collision events, may be avoided or reduced to a negligible level.

An aspect of the disclosure allows collision detection to be performed with some latency. In other words, real time processing may not be necessary. The reasonable latency that is not expected to affect overall collision mitigation delay may be within the SPS period boundaries and may mitigate instant processing of peak loads.

A further aspect of the disclosure provides that collision report transmission may be collision event driven. Alternatively, the collision report transmission may occur in a selected time period, such as once per minimum time period with no collision indication but with a description of the monitored resources subset.

Figure 8:
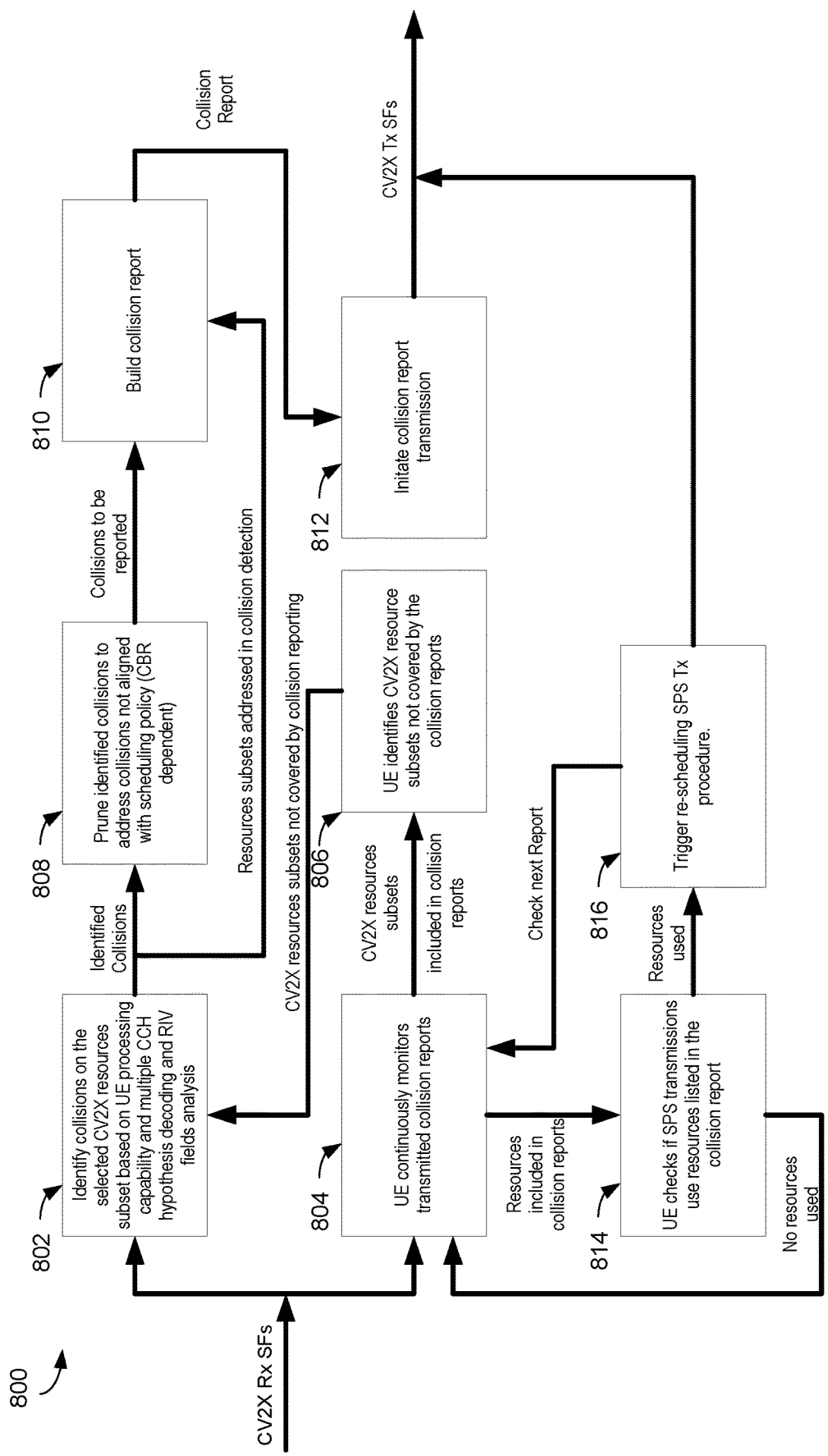
FIG. 8 is a flow diagram of collision measurement and reporting for a sidelink receiving user equipment (UE), in accordance with aspects of the disclosure.

FIG. 8 is a flow diagram of collision measurement and reporting for a sidelink receiving user equipment (UE), in accordance with aspects of the disclosure. A method 800 begins with cellular vehicle-to-everything (CV2X) sub-frames (Rx SFs) received by the sidelink UE. The sidelink UE may be the UE 104, 402, 404, and 406 of FIGS. 1 and 4. The received subframes are input to a UE, specifically, the collision detection module 198 of FIG. 1. In block 802, the UE identifies collisions on the selected CV2X resources subset based on a UE processing capability, as well as multiple control channel (CCH) hypothesis decoding, and resource indication value (RIV) field analysis. In parallel with identifying collisions at block 802, in block 804, the UE continuously monitors transmitted collision reports. If any CV2X resources subsets are identified in the collision reports, then, in block 806 the UE identifies CV2X resource subsets not covered by the collision reports. The CV2X resource subsets not covered by the collision reports are input to block 802, which is described above.

From block 802, the identified collisions are input to block 808, where the UE prunes identified collisions. The UE prunes the collisions to remove collisions that may be aligned with a scheduling policy, for example, intentional collisions that may take place in a congested CV2X channel scenario are pruned. The pruning may be CBR dependent. The collisions to be reported and resource subsets addressed by the collision detection are input to block 810, where the UE builds the collision report. At block 812, the UE initiates collision report transmission. The collision report is then transmitted on CV2X transmission subframes (Tx SFs) as a CV2X collision report.

From block 804, the UE also identifies resources included in the collision reports. In block 814, the UE may check if any current semi-persistent schedule (SPS) transmissions, or any other type of future scheduled transmissions or allocations use resources listed in the collision report. If no resources used by the UE are included in the collision report, processing returns to block 804 and the UE continues to monitor transmitted collision reports. If the UE does assign for SPS transmission (or any other scheduled transmission) any resources listed in the collision report, the process moves to block 816. At block 816, the UE triggers a rescheduling procedure for SPS transmission, or any other transmission involved in the collisions indicated in the received collision report. In other words, the sidelink transmitting UE reschedules its transmissions based on the collision report. The rescheduling may be based on the UE sensing procedures.

As indicated above FIGS. 6, 7, and 8 are provided as examples. Other examples may differ from what is described with respect to FIGS. 6, 7, and 8.

Figure 9:
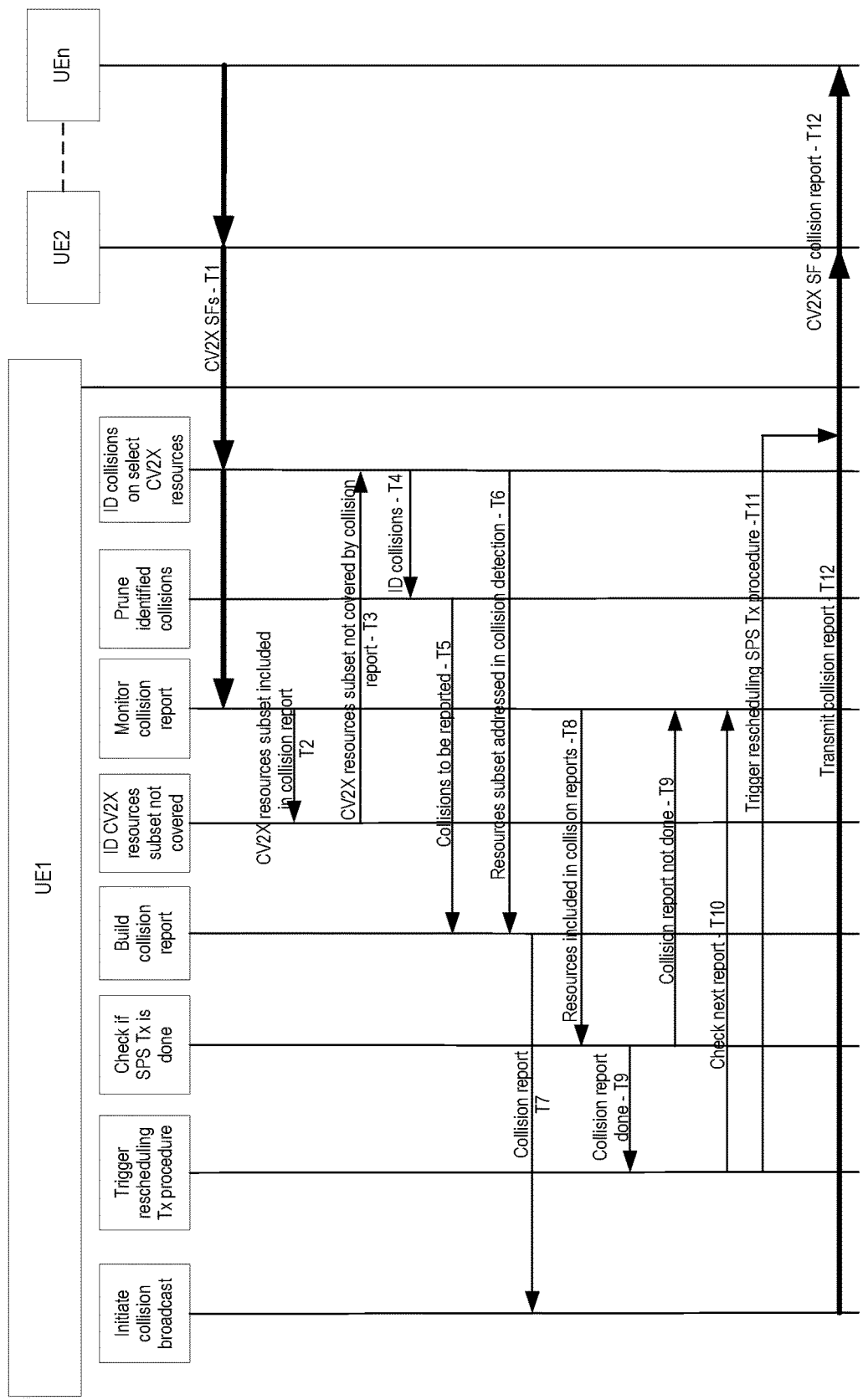
FIG. 9 is a call flow diagram illustrating collision detecting and reporting by a sidelink receiving user equipment (UE), in accordance with aspects of the disclosure.

FIG. 9 is a call flow diagram illustrating collision detecting and reporting by a sidelink receiving user equipment (UE), in accordance with aspects of the disclosure. The call flow begins with multiple UEs, such as UE 2-UE n transmitting collision reports on cellular vehicle-to-everything (CV2X) subframes (SFs), at time T1, to UE 1. At time T2, UE 1, which is monitoring for transmitted collision reports, identifies the indicated CV2X resources with colliding allocations from the collision report. The sidelink UE receiving the collision report may be the UE 104, 402, 404, and 406 of FIGS. 1 and 4. UE 1 also identifies CV2X resources not covered in the collision report at time T3. UE 1 then identifies collisions on selected CV2X resources at time T4. At time T5, UE 1 prunes the detected collisions in the collision report and determines the collisions to be reported. At time T6, UE 1 determines which resources subset is addressed in the collision detection. Then, at time T7, UE 1 begins building the collision report. At time T8, UE 1 includes resources addressed in the allocation collision detection. The building of the collision report is completed by time T9. Alternatively, at time T9, UE 1 checks the next received collision report as it continues to monitor for received collision reports at time T10. If necessary, UE 1 triggers rescheduling for its SPS transmissions or any other scheduled transmissions at time T11. At time T12, UE 1 transmits the collision report to UE 2 through UE n as a CV2X collision report.

Figure 10:
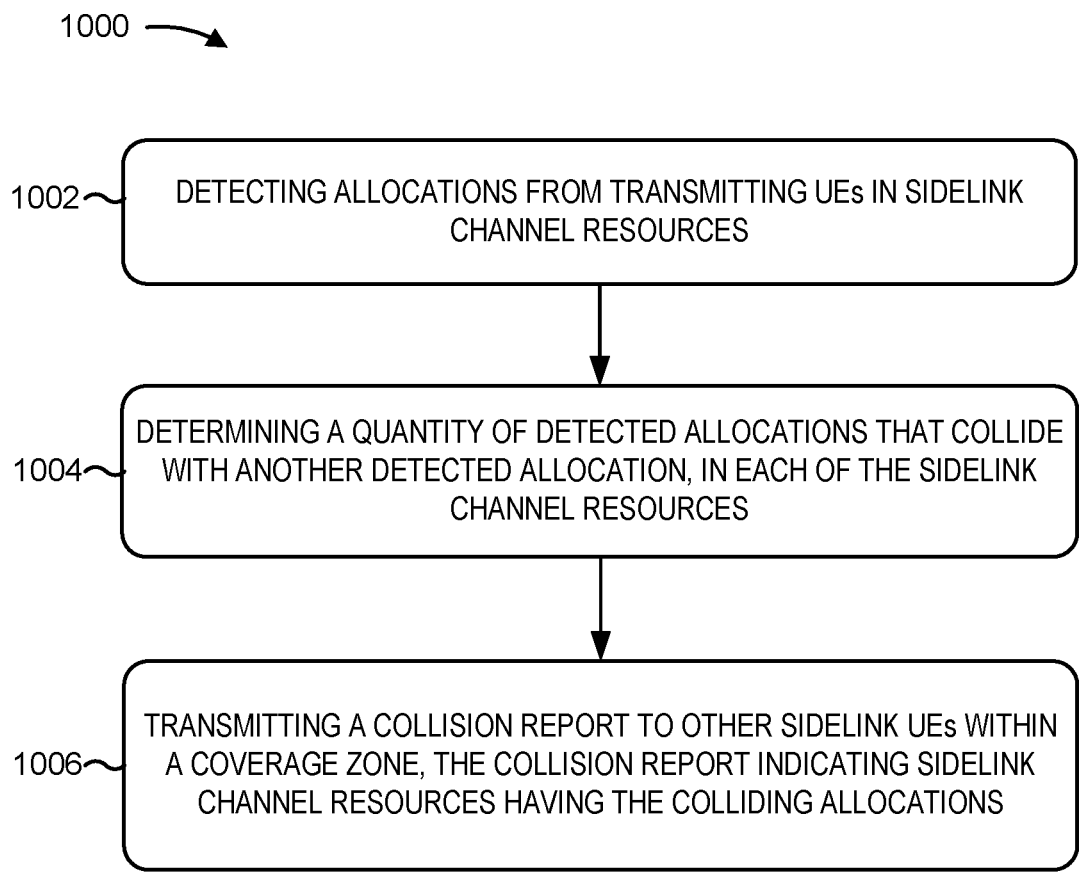
FIG. 10 is a flow diagram of a method of wireless communication by a sidelink transmitting user equipment (UE), in accordance with aspects of the disclosure.

FIG. 10 is a flow diagram of a method 1000 of wireless communication by a sidelink user equipment (UE), in accordance with aspects of the disclosure. The method 1000 begins in block 1002, with detecting allocations (e.g., PSCCHs) and shared channels (e.g., PSSCHs) from transmitting UEs in sidelink channel resources. The sidelink UE may be the UE 104, 402, 404, and 406 of FIGS. 1 and 4, as well as any infrastructure unit, such as the RSU 410 of FIG. 4. Any CV2X UE not transmitting may receive. Next, in block 1004, the method continues with determining a quantity of detected allocations that collide with another detected allocation, in each of the sidelink channel resources. Then, in block 1006, the method continues with transmitting a collision report to other sidelink UEs within a coverage zone, the collision report indicating sidelink channel resources having the colliding allocations. The foregoing describes the method used with colliding allocations in a broadcast or multicast system. In a unicast transmission system where the identity of the UE having colliding allocation is known, a collision notification may be provided to the specific UE using the resource with a detected collision.

Aspects of the disclosure also provide for monitoring the collision reports received from at least one of the other sidelink UEs within the coverage zone. In addition, the disclosure identifies usage of resources indicated as having the colliding allocations on those resources in the collision report for a scheduled transmission by the UE. Collisions are handled by rescheduling a transmission resource to a non-colliding sidelink channel resource in response to identifying that resources indicated as having the colliding allocations. Potentially intentional collisions may be pruned from the collision report before transmission to other sidelink UEs in the coverage zone.

The pruning may comprise sorting the colliding allocation for each sidelink resource based on an associated received signal received power (RSRP) value. The pruning of the list of identified collisions on the sidelink resource may be based on a difference in RSRP value for the colliding allocations, a threshold associated with a channel busy ratio (CBR), as well as the priorities of the allocations.

The collision report may identify the channel resources having colliding allocations using a two dimensional time frequency grid. The collision report indicates which resources have identified allocation collisions. The partial overlapping may be based on a mapping of shared resource indication values (RIV). In addition, the collision between a detected control channel and a shared channel may be based on a mapping of signaled shared channel locations determined from the corresponding RIVs. The collision report may be transmitted over a physical layer in a standardized report format in a deployment including CV2X frequency bands and wide area network frequency bands.

Implementation examples are described in the following numbered clauses.

1. A method of wireless communication by a sidelink user equipment (UE), comprising:
   detecting allocations from a plurality of transmitting UEs in a plurality of sidelink channel resources;
   determining a quantity of colliding allocations including detected allocations that collide with another detected allocation, in each of the plurality of sidelink channel resources; and
   transmitting a collision report to other sidelink UEs within a coverage zone, the collision report indicating sidelink channel resources having the colliding allocations.
2. The method of clause 1, further comprising:
   monitoring for collision reports received from at least one of the other sidelink UEs within the coverage zone;
   identifying usage of resources indicated as having a colliding allocation in the collision report for a scheduled transmission by the sidelink UE; and rescheduling a transmission resource to a non-colliding sidelink channel resource in response to identifying that the transmission resource is indicated as having the colliding allocations.
3. The method of any of the preceding clauses, in which the transmission resource is an active scheduled transmission resource comprising a semi-persistently scheduled (SPS) transmission resource or a reserved retransmission resource.
4. The method of any of the preceding clauses, further comprising pruning potentially intentional collisions from the collision report before transmitting the collision report to the other sidelink UEs within the coverage zone.
5. The method of any of the preceding clauses, in which pruning comprises: sorting the colliding allocations for each sidelink resource based on an associated received signal received power (RSRP) value; and
   pruning a list of the colliding allocations on the sidelink resource from the collision report based on a difference in RSRP value for associated colliding allocations, a threshold associated with a channel busy ratio (CBR) and priorities of the colliding allocations.
6. The method of any of the preceding clauses, in which the collision report identifies sidelink channel resources having the colliding allocations using a two dimensional time frequency grid.
7. The method of any of the preceding clauses, in which a collision between a detected control channel and a shared channel is based on a mapping of signaled shared channel locations determined from a corresponding resource indication value (RIV).
8. The method of any of the preceding clauses, in which the collision report identifies full or partial overlapping of the colliding allocations.
9. The method of any of the preceding clauses, in which partial overlapping determination is based on a mapping of shared channel RIVs determined from a plurality of corresponding detected control channel allocations.
10. The method of any of the preceding clauses, in which the collision report is transmitted using a unicast or multicast transmission to a list of UEs involved in the colliding allocations.
11. The method of any of the preceding clauses, in which determining the quantity of colliding allocations comprises decoding multiple control channel hypotheses for each control channel resource.
12. The method of any of the preceding clauses, further comprising processing only a subset of all resources for collision report evaluation.
13. The method of any of the preceding clauses, in which the subset is based on UE capability.
14. The method of any of the preceding clauses, in which the colliding allocations collide in a same subframe while being assigned to different sidelink subchannels.
15. The method of any of the preceding clauses, further comprising transmitting the collision report over a physical layer in a standardized report format in a deployment including a plurality of C2VX frequency bands and wide area network frequency bands.
16. The method of the preceding clauses 1-14, further comprising transmitting the collision report over an application layer in a deployment including a plurality of C2VX frequency bands and wide area network frequency bands.
17. The method of the preceding clauses 1-14, further comprising transmitting the collision report in a safety application layer in a deployment including C2VX frequency bands.
18. The method of the preceding clauses 1-15, further comprising transmitting the collision report in a physical layer in a deployment including C2VX frequency bands.
19. An apparatus for wireless communication by a sidelink user equipment (UE), comprising:
   a memory; and
   at least one processor coupled to the memory and configured:
   to detect allocations from a plurality of transmitting UEs in a plurality of sidelink channel resources;
   to determine a quantity of colliding allocations including detected allocations that collide with another detected allocation, in each of the plurality of sidelink channel resources; and
   to transmit a collision report to other sidelink UEs within a coverage zone, the collision report indicating sidelink channel resources having the colliding allocations.

20. The apparatus of clause 19, in which the at least one processor is further configured:
to monitor for collision reports received from at least one of the other sidelink UEs within the coverage zone;
to identify usage of resources indicated as having a colliding allocation in the collision report for a scheduled transmission by the sidelink UE; and
to reschedule a transmission resource to a non-colliding sidelink channel resource in response to identifying the transmission resource is indicated as having the colliding allocations.

21. The apparatus of any of the preceding clauses, in which the at least one processor is further configured to prune potentially intentional collisions from the collision report before transmitting the collision report to the other sidelink UEs within the coverage zone.

22. The apparatus of any of the preceding clauses, in which the at least one processor is further configured:
to sort the colliding allocations for each sidelink resource based on an associated received signal received power (RSRP) value; and
to prune a list of the colliding allocations on the sidelink resource from the collision report based on a difference in RSRP value for associated colliding allocations, a threshold associated with a channel busy ratio (CBR) and priorities of the colliding allocations.

23. The apparatus of any of the preceding clauses, in which the collision report identifies sidelink channel resources having the colliding allocations using a two dimensional time frequency grid.

24. The apparatus of any of the preceding clauses, in which a collision between a detected control channel and a shared channel is based on a mapping of signaled shared channel locations determined from a corresponding resource indication value (RIV).

25. The apparatus of any of the preceding clauses, in which the collision report identifies full or partial overlapping of the colliding allocations.

26. The apparatus of any of the preceding clauses, in which partial overlapping determination is based on a mapping of shared channel RIVs determined from a plurality of corresponding detected control channel allocations.

27. The apparatus of any of the preceding clauses, in which the collision report is transmitted using a unicast or multicast transmission to a list of UEs involved in the colliding allocations.

28. The apparatus of any of the preceding clauses, in which determining the quantity of colliding allocations comprises decoding multiple control channel hypotheses for each control channel resource.

29. The apparatus of any of the preceding clauses, further comprising processing only a subset of all resources for collision report evaluation.

30. The apparatus of any of the preceding clauses, in which the subset is based on UE capability.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a sidelink user equipment (UE), comprising:
detecting allocations from a plurality of transmitting UEs in a plurality of sidelink channel resources;
determining a quantity of colliding allocations including detected allocations that collide with another detected allocation, in each of the plurality of sidelink channel resources;
pruning potentially intentional collisions from a collision report, based on the determined quantity of colliding allocations, before transmitting the collision report to other sidelink UEs within a coverage zone; and
transmitting the collision report to the other sidelink UEs within the coverage zone, the collision report indicating sidelink channel resources having the colliding allocations.

2. The method of claim 1, further comprising:
monitoring for collision reports received from at least one of the other sidelink UEs within the coverage zone;

identifying usage of resources indicated as having a colliding allocation in the collision report for a scheduled transmission by the sidelink UE; and rescheduling a transmission resource to a non-colliding sidelink channel resource in response to identifying that the transmission resource 1s indicated as having the colliding allocations.

3. The method of claim 2, in which the transmission resource is an active scheduled transmission resource comprising a semi-persistently scheduled (SPS) transmission resource or a reserved retransmission resource.

4. The method of claim 1, in which pruning comprises:
sorting the colliding allocations for each sidelink resource based on an associated received signal received power (RSRP) value; and
pruning a list of the colliding allocations on the sidelink resource from the collision report based on a difference in RSRP value for associated colliding allocations, a threshold associated with a channel busy ratio (CBR) and priorities of the colliding allocations.

5. The method of claim 1, in which the collision report identifies sidelink channel resources having the colliding allocations using a two dimensional time frequency grid.

6. The method of claim 1, in which a collision between a detected control channel and a shared channel is based on a mapping of signaled shared channel locations determined from a corresponding resource indication value (RIV).

7. The method of claim 1, in which the collision report identifies full or partial overlapping of the colliding allocations.

8. The method of claim 7, in which partial overlapping determination is based on a mapping of shared channel RIVs determined from a plurality of corresponding detected control channel allocations.

9. The method of claim 1, in which the collision report is transmitted using a unicast or multicast transmission to a list of UEs involved in the colliding allocations.

10. The method of claim 1, in which determining the quantity of colliding allocations comprises decoding multiple control channel hypotheses for each control channel resource.

11. The method of claim 1, further comprising processing only a subset of all resources for collision report evaluation.

12. The method of claim 11, in which the subset is based on UE capability.

13. The method of claim 1, in which the colliding allocations collide in a same subframe while being assigned to different sidelink subchannels.

14. The method of claim 1, further comprising transmitting the collision report over a physical layer in a standardized report format in a deployment including a plurality of C2VX frequency bands and wide area network frequency bands.

15. The method of claim 1, further comprising transmitting the collision report over an application layer in a deployment including a plurality of C2VX frequency bands and wide area network frequency bands.

16. The method of claim 1, further comprising transmitting the collision report in a safety application layer in a deployment including C2VX frequency bands.

17. The method of claim 1, further comprising transmitting the collision report in a physical layer in a deployment including C2VX frequency bands.

18. An apparatus for wireless communication by a sidelink user equipment (UE), comprising:
a memory; and
at least one processor coupled to the memory and configured:
to detect allocations from a plurality of transmitting UEs in a plurality of sidelink channel resources;
to determine a quantity of colliding allocations including detected allocations that collide with another detected allocation, in each of the plurality of sidelink channel resources;
to prune potentially intentional collisions from a collision report, based on the determined quantity of colliding allocations, before transmitting the collision report to other sidelink UEs within a coverage zone; and
to transmit the collision report to the other sidelink UEs within the coverage zone, the collision report indicating sidelink channel resources having the colliding allocations.

19. The apparatus of claim 18, in which the at least one processor is further configured:
to monitor for collision reports received from at least one of the other sidelink UEs within the coverage zone;
to identify usage of resources indicated as having a colliding allocation in the collision report for a scheduled transmission by the sidelink UE; and
to reschedule a transmission resource to a non-colliding sidelink channel resource in response to identifying the transmission resource is indicated as having the colliding allocations.

20. The apparatus of claim 18, in which the at least one processor is further configured:
to sort the colliding allocations for each sidelink resource based on an associated received signal received power (RSRP) value; and
to prune a list of the colliding allocations on the sidelink resource from the collision report based on a difference in RSRP value for associated colliding allocations, a threshold associated with a channel busy ratio (CBR) and priorities of the colliding allocations.

21. The apparatus of claim 18, in which the collision report identifies sidelink channel resources having the colliding allocations using a two dimensional time frequency grid.

22. The apparatus of claim 18, in which a collision between a detected control channel and a shared channel is based on a mapping of signaled shared channel locations determined from a corresponding resource indication value (RIV).

23. The apparatus of claim 18, in which the collision report identifies full or partial overlapping of the colliding allocations.

24. The apparatus of claim 23, in which partial overlapping determination is based on a mapping of shared channel RIVs determined from a plurality of corresponding detected control channel allocations.

25. The apparatus of claim 18, in which the collision report is transmitted using a unicast or multicast transmission to a list of UEs involved in the colliding allocations.

26. The apparatus of claim 18, in which determining the quantity of colliding allocations comprises decoding multiple control channel hypotheses for each control channel resource.

27. The apparatus of claim 18, further comprising processing only a subset of all resources for collision report evaluation.

28. The apparatus of claim 27, in which the subset is based on UE capability.

* * * * *